Aug. 9, 1927.
F. A. FUCI
1,638,802
GEAR SHIFT CONTROL APPARATUS
Filed July 3, 1926     3 Sheets-Sheet 1
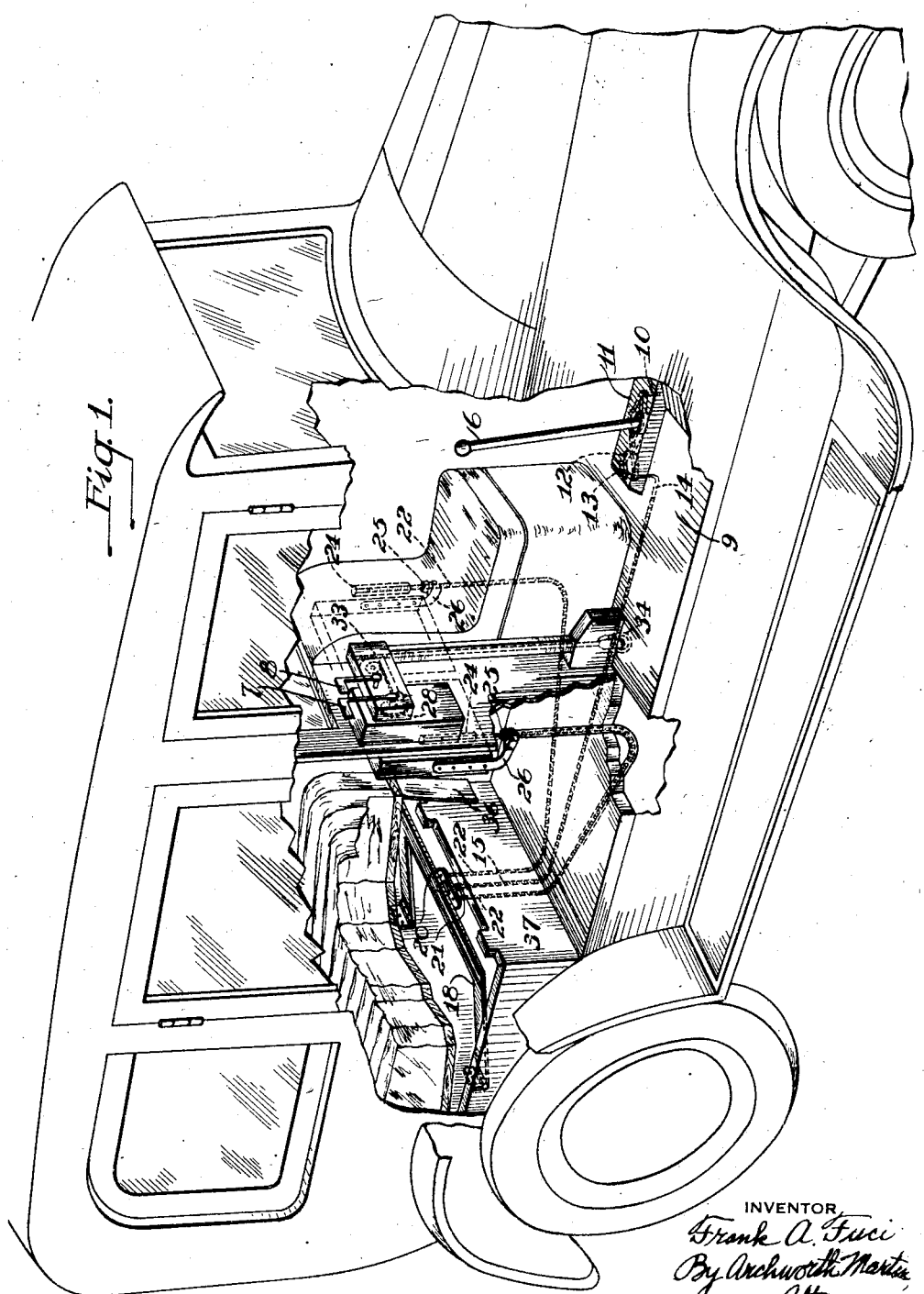
INVENTOR,
Frank A. Fuci
By Archworth Martin
Attorney Aug. 9, 1927.
F. A. FUCI
1,638,802
GEAR SHIFT CONTROL APPARATUS
Filed July 3, 1926   3 Sheets-Sheet 2
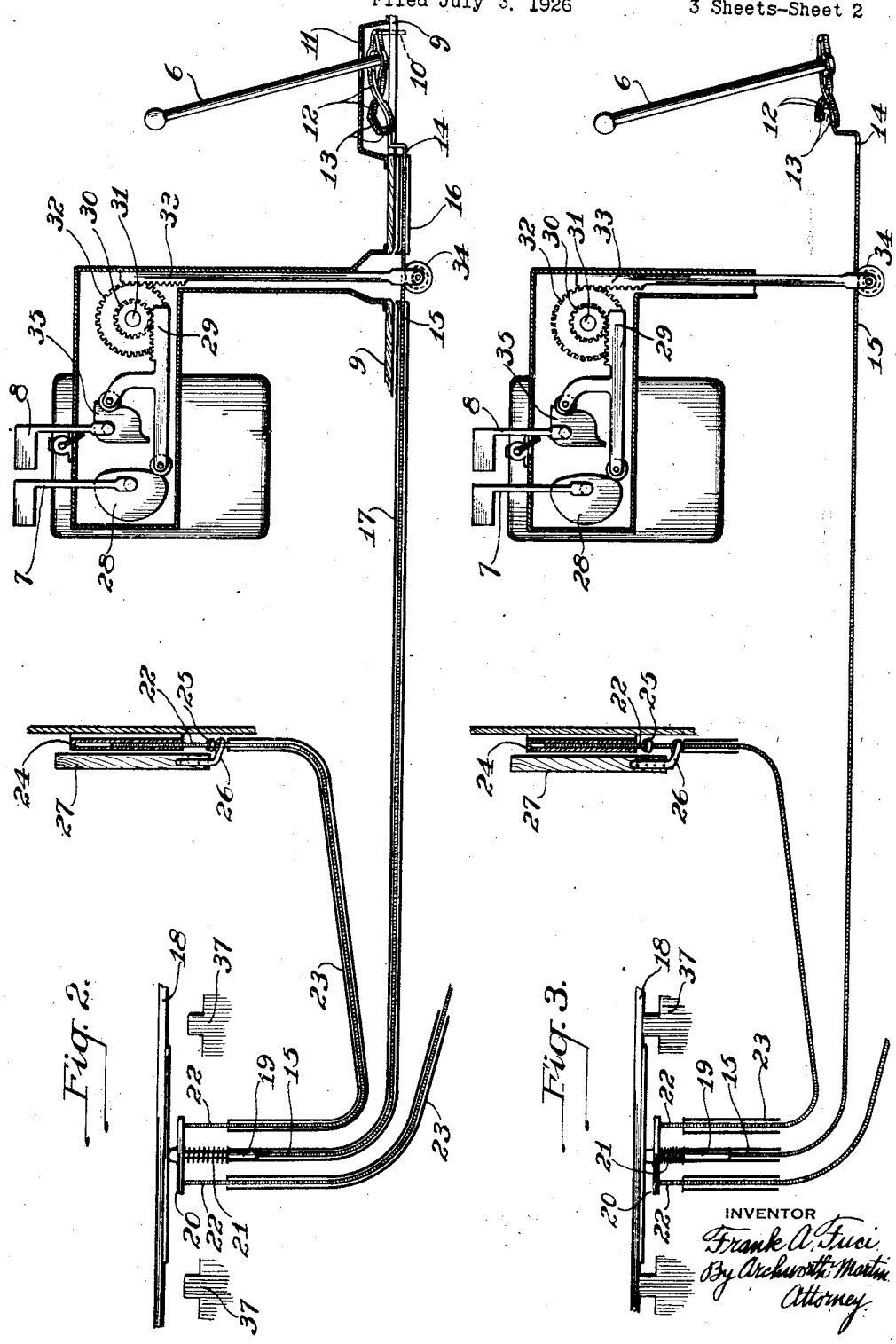
INVENTOR
Frank A. Fuci
By Archworth Martin
Attorney

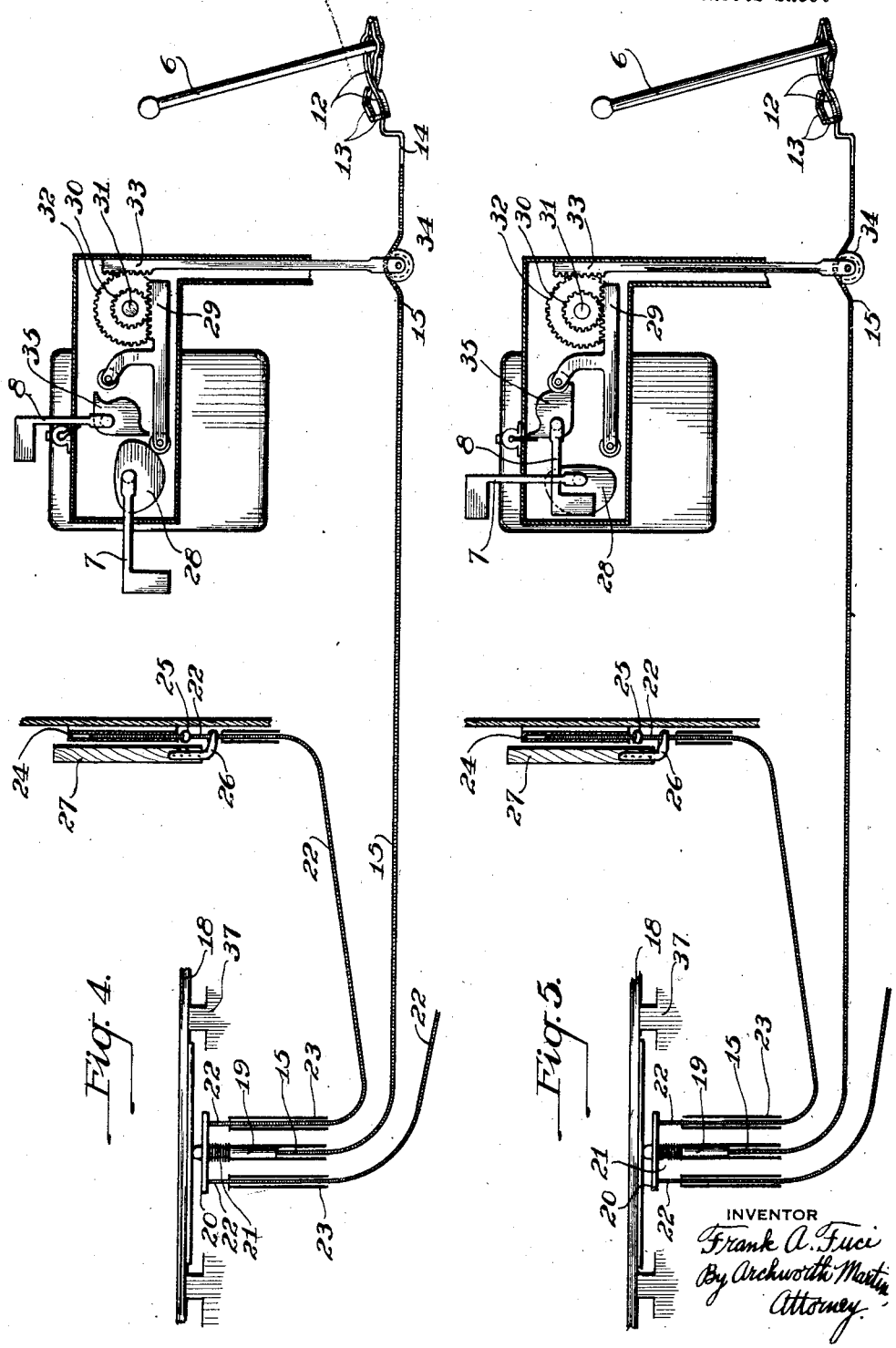

Patented Aug. 9, 1927.

1,638,802

UNITED STATES PATENT OFFICE.

FRANK A. FUCI, OF PITTSBURGH, PENNSYLVANIA.

GEAR-SHIFT-CONTROL APPARATUS.

Application filed July 3, 1926. Serial No. 120,441.

My invention relates to mechanism for controlling movement of the gear shift levers of automobiles and the like, and is more particularly applicable to public service vehicles such as taxicabs, to prevent the drivers thereof from defrauding their employers.

My invention has for one of its objects the provision of means for preventing operation of the gear shift lever of a taxicab during occupancy thereof by a passenger, until after the driver has thrown a recording meter, such as an hour meter or a mileage meter, into operation.

One form which my invention may take is shown in the accompanying drawing, wherein Figure 1 is a perspective view partially broken away, showing a taxicab equipped with my invention; Fig. 2 is a side elevational view, partially in section, of a portion of the apparatus of Fig. 1; Fig. 3 is a view showing the position of the locking device for the gear shift lever when the rear seat of the vehicle is occupied by a passenger; Fig. 4 is a view similar to Fig. 3, but showing the locking device released through placing of the mileage meter in operation, and Fig. 5 is a view showing the manner in which the locking device is released through setting of the hour meter in operation.

Referring to Figs. 1 and 2, I show a taxicab, or the like, that is provided with a gear shift lever 6 by which speed change mechanism (not shown) is actuated in the usual manner. The vehicle is also shown as provided with a meter for indicating the distance traveled, and a meter or clock for registering periods of time, which may be selectively operated in the usual manner. The distance meter is thrown into operation by the lowering of a lever 7 upon which may be printed the usual "vacant" sign, and the clock meter is thrown into operation by lowering of a lever 8 that carries another "vacant" sign.

The gear shift lever 6 extends through a floor board 9 in the usual manner and a locking device is secured to the floor board by means of a bolt 10. A cover plate 11 is fastened to the floor to protect the locking device and prevent tampering therewith. The locking device consists of a pair of locking bars 12 that have semi-circular recesses adjacent to their forward ends for snugly engaging the gear shift lever when the crossed rear ends of said locking bars are moved apart. The bars 12 are pivotally connected at their forward ends to the bolt 10 and are connected at their rear ends by a pair of toggle links 13. A thrust bar 14 is connected to the toggles 13 so that as such bar is reciprocated in a longitudinal direction the toggles will be actuated to expand and contract the links 12. A thrust or push bar 15 of flexible material, such as that employed in making flexible shafts for driving meters and the like, is connected to the rear end of the thrust bar 14 and extends through metal tubes 16 and 17 to a point beneath the rear seat 18. A post 19 is secured to the rear end of the bar 15 and carries at its upper end a plate 20 which normally engages a seat 18. The plate 20 is yieldably held in its uppermost position, as shown in Fig. 2, by a spring 21 interposed between such plate and the rear end of the tube 17.

A pair of flexible tension bars 22, which may be of the same material as the bar 15, are secured to the plate 20 and extend through tubes 23 into recessed guide members 24. A stop member 25 is secured to each of the tension members 22 in position to be engaged by a forked extension 26 of each of the auxiliary seats 27 with which taxicabs are ordinarily provided. The tubes 16, 17 and 23 serve as guides for the bars 15 and 22, and the tubes 16 and 17 prevent buckling of the bar 15 when it is moved forwardly by the depression of the plate 20. When a passenger enters the vehicle and occupies the seat 18, the plate 20 is depressed and the bars 15 and 14 are thrust forwardly, moving the toggle links 13 to the position shown in Fig. 3, and spreading the rear ends of the links 12 apart, thus causing their semi-circular portions to closely engage the lever 6, when the gear shift lever 6 is in neutral position. In order to release the lever 6, the driver must depress either the lever 7, as shown in Fig. 4, or the lever 8, as shown in Fig. 5, and thereby place one of the meters in operation.

The lever 7 is provided with a cam 28 that engages a roller on a rack bar 29 to force said rack bar toward the right and rotate the pinion 30 in a counter-clockwise direction. The pinion 30 is secured to a shaft 31, to which is also connected a gear wheel 32. The gear wheel 32 meshes with a rack bar 33 that carries at its lower end a sheave 34 which engages the bar 15. The rack bar 33 can therefore be elevated, to bend upwardly that portion of the bar 15 which lies between the adjacent ends of the tubes 16 and 17, thus moving the toggles 13 and the locking bars 12 to the position shown in Figs. 4 and 5 and releasing the lever 6.

When the bar 15 is bent to release the lever 6, the forward end of such bar will be retracted, because the rear end thereof is held against longitudinal movement forwardly by reason of its connection the plate 20 which is held against further downward movement, by the spring 21.

If it is desired to charge a passenger on an hourly basis, instead of at a mileage rate, the lever 7 is allowed to remain in raised position and the lever 8 depressed to cause a cam 35 which is carried thereby, to shift the rack bar 29 and elevate the rack bar 33.

If the gear shift lever 6 should be out of neutral when a passenger enters the vehicle, attempted movement thereof past neutral to some other position would bring it into registry with the semi-circular seating portions in the locking bars 12 and it would be thereupon locked in neutral position, by reason of the thrust present upon the bar 15.

In case a passenger chose to occupy one of the auxiliary seats 27 instead of the rear seat 18, movement of either of the seats 27 to horizontal position would cause its forked extension 26 to engage the stop 25 and move it from a position shown in Fig. 2 to that shown in Fig. 3, thus causing the member 22 to exert a downward pull on the plate 20, away from the seat 18, and imposing a forward thrust on the bars 15 to move the toggles 13 and lock the lever 6.

A sealing flap 36 may be secured to the free edges of the seat 18, to prevent the placing of an obstruction between the seat and its box 37.

It will be understood that various modifications in detail and general arrangement may be made without departing from the spirit and scope of the invention as defined in the accompanying claims, and that the apparatus is capable of use in various other relations where it is desired to releasably lock a movable member against movement except under predetermined conditions.

I claim as my invention:

1. A locking device for gear shift levers, comprising a flexible thrust member, a locking bar actuated by said member, means for effecting longitudinal movement of said member in one direction, and means for bending said member at a point intermediate its ends to effect retractive movement of one of said ends.

2. A locking device for gear shift levers, comprising a flexible thrust member, a guide tube through which said member extends, means adjacent to the rear end of said member for shifting the same longitudinally, a locking bar connected to the forward end of said member, and means for bending said member at a point adjacent to the forward end of the tube to permit release of the locking bar.

3. The combination with a movably mounted vehicle seat, a plurality of meter control levers, and a gear shift lever, of a locking bar for said gear shift lever, a thrust member for actuating said bar and having operative connection with said seat, and a connection between said bar and said meter control levers, for permitting the said thrust member to be rendered inoperative upon movement of either of said control levers.

4. The combination with a gear shift lever, of a locking bar therefor, a flexible thrust member for actuating said bar, and means for bending a portion of said thrust member to render the same inoperative.

5. The combination with a control member for vehicles, of a locking device therefor, a flexible thrust member for operating said device, a meter control lever, and a connection between said lever and the thrust member for bending the thrust member to render it inoperative when the said lever is moved to a given position.

In testimony whereof I, the said FRANK A. FUCI, have hereunto set my hand.

FRANK A. FUCI.